(12) United States Patent
Akedo

(10) Patent No.: US 6,395,938 B1
(45) Date of Patent: May 28, 2002

(54) METHOD OF REGULATING MOLECULAR WEIGHT DISTRIBUTION OF POLYETHER GLYCOL

(75) Inventor: Takaharu Akedo, Otsu (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/701,007

(22) PCT Filed: May 19, 1999

(86) PCT No.: PCT/JP99/02603

§ 371 (c)(1),
(2), (4) Date: Nov. 22, 2000

(87) PCT Pub. No.: WO99/61507

PCT Pub. Date: Dec. 2, 1999

(30) Foreign Application Priority Data

May 26, 1998 (JP) .............................................. 10-14476
May 26, 1998 (JP) .............................................. 10-14477

(51) Int. Cl.$^7$ .............................................. C07C 41/01
(52) U.S. Cl. ........................ 568/616; 568/617; 568/619
(58) Field of Search ................................ 568/616, 617, 568/619

(56) References Cited

U.S. PATENT DOCUMENTS

| | | | |
|---|---|---|---|
| 4,568,775 A | * | 2/1986 | Aoshima et al. |
| 5,282,929 A | * | 2/1994 | Dorai et al. |
| 5,395,959 A | * | 3/1995 | Weyer et al. |
| 5,416,240 A | | 5/1995 | Weyer et al. ................ 568/617 |
| 5,659,068 A | | 8/1997 | Weyer et al. ................ 560/103 |

FOREIGN PATENT DOCUMENTS

| | | |
|---|---|---|
| EP | 0 503 392 A2 | 9/1992 |
| EP | 0 503 394 A2 | 9/1992 |
| JP | 61-123626 | 6/1986 |
| JP | 5-17567 | 1/1993 |
| JP | 5-70585 | 3/1993 |
| JP | 5-70586 | 3/1993 |
| JP | 8-231706 | 9/1996 |
| JP | 10-25340 | 1/1998 |

* cited by examiner

*Primary Examiner*—Sreeni Padmanabhan
*Assistant Examiner*—Sikarl A. Witherspoon
(74) *Attorney, Agent, or Firm*—Finnegan, Henderson, Farabow, Garrett & Dunner, L.L.P.

(57) ABSTRACT

A method for controlling the molecular weight distribution of polyether glycol in producing polyether glycol having a specified number average molecular weight by polymerizing tetrahydrofuran as a starting monomer with the use of a heteropoly-acid as a catalyst, which method comprises conducting the polymerization in the presence of an amount of water which can form two phases of the organic phase and a catalyst phase, sampling the polymerization product during the polymerization to determine the molecular weight distribution and, when the molecular weight distribution thus found is narrower than the specified molecular weight distribution, making the residence time distribution of the starting monomer in the catalyst phase wider, while, when the found molecular weight distribution is wider than the specified molecular weight distribution, making the residence time distribution of the starting monomer in the catalyst phase narrower.

5 Claims, 1 Drawing Sheet

METHOD OF REGULATING MOLECULAR WEIGHT DISTRIBUTION OF POLYETHER GLYCOL

This application is a 371 of PCT/JP99/02603, filed May 19, 1999, now WO99/61507 published Dec. 2, 1999.

TECHNICAL FIELD

The present invention relates to a method for controlling the molecular weight distribution of polyether glycol obtained in producing polyether glycol by ring-opening polymerization of tetrahydrofuran (hereinafter referred to as THF) as a starting monomer, using a heteropoly-acid as a catalyst.

BACKGROUND ART

Polyether glycol is an industrially useful polymer as the main raw material of polyurethanes used for polyurethane elastic fiber and synthetic leather, an additive for oil and a softening agent. Polyether glycol is required, in its industrial usage, to have an optimum molecular weight and optimum molecular weight distribution according to the intended uses.

U.S. Pat. Nos. 4,568,775, 4,568,065 and 5,416,240 disclose that heteropoly-acids can be used as a polymerization catalyst in producing polyether glycol. These prior art references disclose the activity of heteropoly-acids as a catalyst. JP-A-5-70585 discloses a method of controlling the average molecular weight of polyoxyalkylene glycol and the derivatives thereof by using a heteropoly-acid as a catalyst. However, none of these prior art references disclose a method for controlling the molecular weight distribution of the polyether glycol obtained.

One of the known methods for obtaining polyether glycol having an optimum narrow molecular weight distribution which can meet the various intended uses is, as disclosed in U.S. Pat. No. 5,053,553, a method wherein polytetramethylene-ether glycol (hereinafter referred to as PTMG) obtained by polymerization is subjected to liquid-liquid extraction using methanol, water and a specific non-polar solvent to separate a solvent phase of the upper layer containing PTMG having a narrow molecular weight distribution, thereby to obtain PTMG having a narrow molecular weight distribution. In this method, however, in addition to the step of polymerization of polyether glycol, an extraction step and further a recovery step must be conducted; moreover, since an organic solvent is used, the cost for its recovery etc. must be added, leading to economical disadvantage.

Though polyether glycol is sometimes used independently as an additive and the like, it is mostly used as a reaction starting material. Therefore, a specified number average molecular weight and a specified molecular weight distribution are required according to intended uses.

In particular, when polyether glycol is used as the raw material for elastic fiber typically represented by polyurethane fiber, since the molecular weight distribution of polyether glycol exerts an influence on the elastic function, particularly on the recovery, of elastic fiber, a process for producing polyether glycol is awaited which can control the molecular weight distribution as desired.

The process for producing polyether glycol using a heteropoly-acid as a catalyst is attracting much attention, because it allows the presence of water in the reaction system and makes it possible to conduct polymerization in one stage reaction. In particular, in the production of polyether glycol using this catalyst, a process is eagerly desired which can precisely control the molecular weight distribution of the polymer.

DISCLOSURE OF THE INVENTION

The object of the present invention is to provide, in producing polyether glycol by using a heteropoly-acid as a catalyst, a method which can efficiently adjust the molecular weight distribution of the polyether glycol obtained to a specified value or into a specified range.

The present invention provides a method for controlling the molecular weight distribution of polyether glycol obtained which comprises, in a THF polymerization reaction system using a heteropoly-acid as a catalyst, making an amount of water which can form two phases, namely an organic phase (THF phase) and a catalyst phase, present in the reaction system, and controlling the residence time distribution of the starting monomer in the catalyst phase in the reaction vessel, thereby to control the molecular weight distribution of the polyether glycol obtained. namely a organic phase (THF place) and a catalyst phase, present in the reaction system, and controlling the residence time distribution of the starting monomer in the catalyst phase in the reaction vessel, thereby to control the molecular weight distribution of the polyether glycol obtained.

It is disclosed in JP-A-59-221326 that the amount of water coordinated to a heteropoly-acid influences the catalytic activity, and the amount of water coordinated to a heteropoly-acid and the number average molecular weight obtained by polymerizing THF are correlated to each other. However, though the above document describes that the molecular weight distribution of the polyether diol obtained is sharp, it describes nothing about the control of molecular weight distribution.

The present inventors have made extensive study on controlling the molecular weight distribution of polyether glycol obtained by polymerizing THF with maintaining the number of coordinated water of catalyst in the reaction system constant. As a result, it has been found out that the molecular weight distribution of polyether glycol can be precisely controlled without substantially changing its number average molecular weight by keeping the feed amount of the starting monomer THF relative to the catalyst phase approximately constant in the reaction vessel and controlling the residence time distribution of the starting monomer which reacts in the catalyst phase. The present invention has been accomplished on the basis of the above finding.

According to the present invention, there is provided a method for controlling the molecular weight distribution of polyether glycol obtained in producing polyether glycol having a specified number average molecular weight by polymerizing THF as a starting monomer with the use of a heteropoly-acid as a catalyst, which method comprises conducting the polymerization in the presence of an amount of water which can form two phases of the organic phase and the catalyst phase, sampling the polymerization product during the polymerization to determine the molecular weight distribution and, when the molecular weight distribution thus found is narrower than the specified molecular weight distribution, making the residence time distribution of the starting monomer in the catalyst phase wider, while, when the found molecular weight distribution is wider than the specified molecular weight distribution, making the residence time distribution of the starting monomer in the catalyst phase narrower.

According to the present invention, there is further provided a process for producing polyether glycol having a specified number average molecular weight and a specified molecular weight distribution by polymerizing tetrahydrofuran as a starting monomer with the use of a heteropoly-acid as a catalyst, which process comprises conducting the polymerization in the presence of an amount of water which can form two phases of the organic phase and the catalyst phase, sampling the polymerization product during the polymerization to determine the molecular weight distribution and, when the molecular weight distribution thus found is narrower than the specified molecular weight distribution, making the residence time distribution of the starting monomer in the catalyst phase wider, while, when the found molecular weight distribution is wider than the specified molecular weight distribution, making the residence time distribution of the starting monomer in the catalyst phase narrower.

BEST MODE FOR CARRYING OUT THE INVENTION

Figure 1:
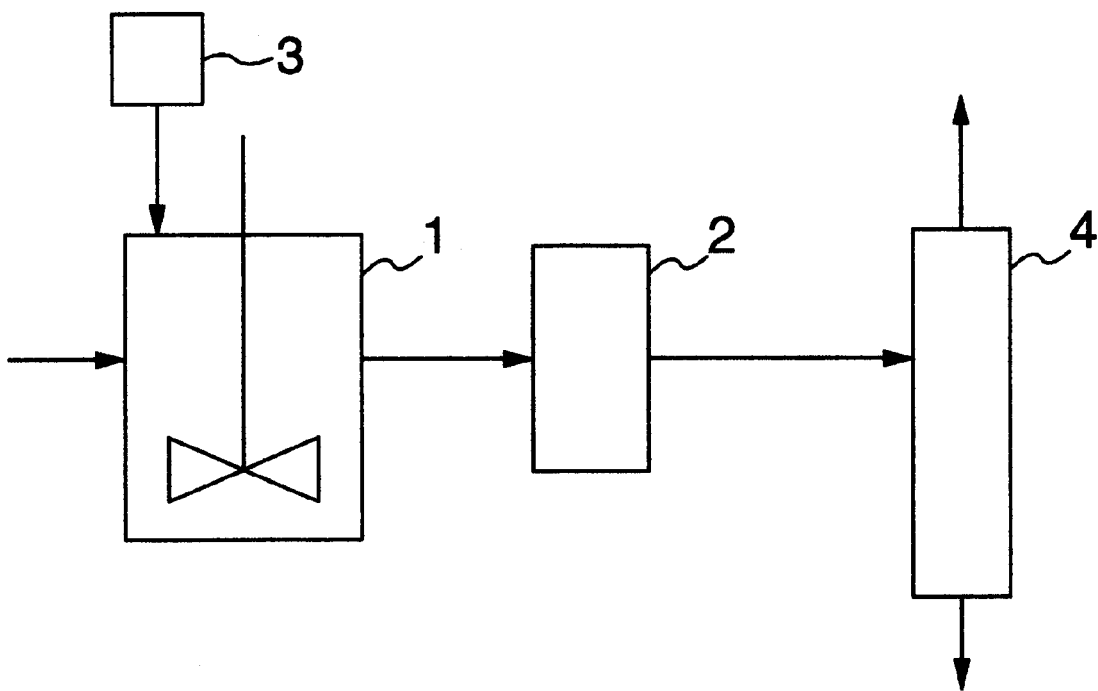
FIG. 1 is a schematic view showing one example of a continuous polymerization apparatus used in the present invention.

In the polymerization of THF using a hetropoly-acid as a catalyst, the reaction system forms an emulsion solution wherein two phases, namely a organic phase containing the polymer and a catalyst phase, are dispersing in the form of liquid droplets.

The polymerization is considered to proceed in the catalyst phase. It is considered that along with the progress of polymerization, polyether glycol dissolving in the catalyst phase is distributed between the catalyst phase and the organic phase and, under the reaction conditions, the distribution is in a stationary state.

In obtaining polyether glycol having a specified number average molecular weight, the molecular weight distribution of the polyether glycol formed can be controlled by controlling the residence time distribution of the starting monomer in the catalyst phase.

It is considered that, the polyether glycol formed in the catalyst phase varies its degree of polymerization according to the residence time of the starting monomer in the catalyst phase, but the polymerization proceeds as an equilibrium reaction. Since the polymer formed in the catalyst phase is distributed to the organic phase, the molecular weight distribution of the polyether glycol finally obtained reflects the molecular weight distribution of polyether glycol in the catalyst phase.

Accordingly, by controlling the distribution of the residence times in the catalyst phase of individual molecules of the starting monomer in the reaction system, the molecular weight distribution of the polymer obtained can be controlled.

The residence time distribution of the starting monomer in the catalyst phase can be controlled, for example, by controlling the contact area and the contact time between the catalyst phase and the organic phase.

Thus, in order to widen the molecular weight distribution of the polymer, the residence time distribution in the catalyst phase of the starting monomer polymerizing in the catalyst phase is widened, while, in order to narrow the molecular weight distribution, the residence time distribution of the starting monomer in the catalyst phase is narrowed; in this manner, the molecular weight distribution can be controlled.

Preferred methods for controlling the residence time distribution of the starting monomer in the catalyst phase include the following methods:

(1) The residence time distribution of the starting monomer in the catalyst phase is controlled by varying the residence time of THF in the reaction vessel (V/F, wherein V is the total liquid volume in the reaction vessel and F is the monomer feed rate to the reaction vessel); when the molecular weight distribution of the polymer is to be widened, the residence time (V/F) is increased, and when the molecular weight distribution is to be narrowed, the residence time (V/F) is decreased; or (2) A reaction vessel equipped with a stirrer is used, and the residence time distribution of the starting monomer in the catalyst phase is controlled by varying the stirring power per unit reaction liquid volume (P/V, wherein P is the stirring power and V is the total liquid volume); when the molecular weight distribution of the polymer formed is to be widened, the stirring power (P/V) is decreased, and when the molecular weight distribution is to be narrowed, the stirring power (P/V) is increased.

In the former method (1), the average residence time of THF in the reaction vessel varies with changes in V/F.

In order to control the molecular weight distribution of the polyether glycol without changing its number average molecular weight, it is necessary to keep the reaction time constant. It has been found, surprisingly, that this can be achieved by keeping the average residence time of THF per unit amount of catalyst constant.

It is considered that the substantial reaction time is kept constant by controlling the amount of catalyst in the reaction vessel. As a result, the molecular weight distribution of the polyether glycol formed can be varied while keeping its number average molecular weight constant.

The working mechanism in controlling molecular weight distribution by varying V/F can be considered as follows.

In a continuous reaction, when V/F is varied, the average residence time of the starting monomer in the reaction vessel changes. At this time, it is considered that when the average residence time is long, the residence time distribution in the catalyst phase of the starting monomer in the reaction vessel becomes wide; conversely, when the average residence time is short, the residence time distribution in the catalyst phase of the starting monomer in the reaction vessel becomes narrow.

That is to say, when V/F is increased, the residence time distribution in the catalyst phase of the starting monomer in the reaction vessel becomes wider and hence the molecular weight distribution of the polyether glycol obtained is widened. Conversely, when V/F is decreased, the residence time distribution in the catalyst phase of the starting monomer in the reaction vessel becomes narrow and hence the molecular weight distribution of the polyether glycol obtained is narrowed.

Thus, the molecular weight distribution of the polyether glycol formed can be controlled by controlling V/F in the continuous reaction.

In the latter method (2), it is considered that by varying the stirring power (P/V), the average particle diameters of the liquid droplets of the catalyst phase or of the organic phase in the reaction vessel vary, so that the contact area between two phases changes and the frequency of coalescence-division of liquid droplets also changes, and consequently the amount of mass transfer between the respective phases changes. Accordingly, by varying the stirring power (P/V), the residence time distribution in the catalyst phase of the starting monomer can be controlled and hence the molecular weight distribution of the polyether glycol obtained can be controlled.

When the stirring power (P/V) is increased, the average particle diameters of the liquid droplets formed by the catalyst phase and the organic phase decrease. Accordingly, the contact area of the two phases increases and, at the same time, the frequency of the coalescence-division of liquid droplets increases. Consequently, the amount of mass transfer between the catalyst phase and the organic phase increases, and hence the residence time of the starting monomer in the catalyst phase becomes more uniform, in other words, the residence time distribution of the starting monomer in the catalyst phase becomes narrower. As a result, the molecular weight distribution of the polyether glycol obtained becomes narrow.

On the contrary, when the stirring power (P/V) is decreased, the contact area of the catalyst phase with the organic phase decreases and, at the same time, the frequency of the coalescence-division of liquid droplets decreases. Consequently, the residence time distribution of the starting monomer in the catalyst phase becomes wider, and hence polyether glycol having wider molecular weight distribution is obtained.

Accordingly, by using a reaction vessel fitted with a stirrer and controlling the stirring power per unit reaction volume (P/V), the molecular weight distribution of the polyether glycol obtained can be controlled while keeping its number average molecular weight constant.

It is considered that the concept of the present invention can be also applied when a reaction vessel which permits mixing without using stirring power, such as a line mixer, is used. In such a case, it is considered that the molecular weight distribution of the polyether glycol obtained can be controlled by controlling the particle diameters of liquid droplets of the catalyst phase or the starting monomer phase in the reaction liquid by such a method as changing the flow rate in the reactor.

The method of controlling the molecular weight distribution of polyether glycol by controlling the THF residence time in the reaction vessel (V/F) and the method of controlling the molecular weight distribution of polyether glycol by controlling the stirring power per unit volume (P/V) as described above may also be used in combination.

A preferred embodiment of the present invention is a method for controlling the molecular weight distribution of polyether glycol obtained in producing polyethylene glycol having a specified number average molecular weight by polymerizing THF as a starting monomer with the use of a heteropoly-acid as a catalyst which method comprises:

(a) the step of obtaining, under reaction conditions for obtaining a polymer product having a specified number average molecular weight, a calibration curve which shows the relationship between the residence time, V/F (when V is the total liquid volume in the reaction vessel and F is the monomer feed rate to the reaction vessel), and/or the stirring power per unit reaction liquid volume in using a reaction vessel with a stirrer, P/V, (wherein P is the stirring power and V is the total liquid volume in the reaction vessel), and the molecular weight distribution, (b) conducting the polymerization in the presence of an amount of water which can form two phases of a organic phase and a catalyst phase, sampling the reaction liquid from the polymerization reactor during the polymerization to determine the number average molecular weight of the polymerization product and, when the number average molecular weight determined deviates from the specified value, modifying the reaction conditions to adjust the number average molecular weight to the specified value, (c) the step of determining the molecular weight distribution of the polymerization product which has reached the specified number average molecular weight, and (d) when the molecular weight distribution determined in the above step (c) differs from the specified value, collating the determined molecular weight distribution with the calibration curve obtained in the step (a) and adjusting the residence time and/or the stirring power to the value(s) corresponding to the specified molecular weight distribution.

The above-mentioned steps (a) to (d) are explained below.

Step (a): The relation(s) between the molecular weight distribution of polyether glycol having a specified number average molecular weight and P/V and/or V/F are (is) determined as an empirical formula. The range of the error of the specified number average molecular weight, which may depend on the intended use of the polyether glycol, is usually not more than ±100, preferably ±50 and, when the polyether glycol is to be used for example as a reaction starting material, more preferably not more than ±30.

When, for example, a PTMG having a number average molecular weight of 1800 is to be produced by using a heteropoly-acid as the catalyst, the following relational expressions of formula (I) and formula (II) can be experimentally determined. In the formulas, Mw/Mn is the ratio of the weight average molecular weight (Mw) to the number average molecular weight (Mn) of the PTMG, obtained by using GPC, and is an index of molecular weight distribution.

$$Mw/Mn = K \cdot (P/V)^{60} \qquad (I)$$

wherein K and $\alpha$ are constants which can be determined experimentally.

$$Mw/Mn = K' \cdot (V/F)^{62} \qquad (II)$$

wherein K' and $\beta'$ are constants which can be determined experimentally.

Step (b): In the presence of an amount of water which can form two phases of a organic phase and a catalyst phase, the polymerization reaction is conducted under conditions under which polyether glycol having the specified number average molecular weight will be obtained, and the number average molecular weight of the polymer obtained is measured. When the number average molecular weight thus measured does not agree with the specified value, adjustment is made so as to attain the specified value by using known methods, for example, the control of the amount of coordinated water of the heteropoly-acid catalyst, the control of the reaction temperature, and the like.

Step (c): The molecular weight distribution (Mw/Mn) of the polyether glycol having the specified number average molecular weight is determined by means of GPC.

Step (d): When Mw/Mn determined by the above step (c) deviates from the specified value (desired value), the molecular weight distribution of PTMG is controlled by varying the residence time (V/F) and/or the stirring power (P/V) on the basis of the calibration curve obtained in the step (a).

Preferably, the steps (b) to (d) are repeated until a polymer having the specified molecular weight distribution Is obtained at the specified number average molecular weight.

In the present invention, the THF residence time V/F in the reaction system is, for controlling the molecular weight distribution of polyether glycol, preferably 0.5–20 hours, more preferably 0.7–15 hours. For obtaining polyether glycol having the specified number average molecular weight, when V/F is decreased, the conversion in reaction decreases and reaction efficiency decreases; when V/F is increased, the reaction time lengthens. Therefore, it is preferable to select V/F from the above mentioned range.

The stirring power P/V in the reaction system is, for controlling the molecular weight distribution of polyether glycol, preferably 0.2–6.0 kW/m$^3$, more preferably 0.75–4.5 kW/m$^3$. When P/V is less than 0.2 kW/m$^3$W the stirring is insufficient, resultantly the distribution of liquid droplet particle diameter in the reaction system becomes wide and the control of the molecular weight distribution becomes difficult. On the other hand, when P/V exceeds 6.0 kW/m$^3$, the stirring efficiency changes no more even when a larger power is applied and also the molecular weight distribution of the polyether glycol obtained does not change.

After completion of the polymerization reaction, the monomer is removed by distillation or the like, from the phase which comprises mainly monomer and older and is obtained by phase separation, to recover polyether glycol.

In the present invention, the production of polyether glycol can be effected, besides by homopolymerization of THF, by using as a comonomer cyclic ethers or diols which are copolymerizable with THF. The comonomers may be, for example, oxetane and oxetane derivatives, e.g., 3,3-dimethyloxetane, cyclic ethers such as methyltetrahydrofuran, 1,3-dioxolan and tetrahydropyran, ethylene glycol, propylene glycol, 1,3-propanediol, 1,3-butanediol, 1,5-pentanediol, 1,6-hexanediol, neopentyl glycol, diethylene glycol, dipropylene glycol and the like.

The "heteropoly-acid" used in the present invention is the generic name of oxyacids formed by the combination of the oxide of at least one element selected from the group consisting of Mo, W and V with an oxyacid containing another element, e.g., P, Si, As, and Ge. The atomic ratio of the former element(s) to the latter element(s) is preferably 2.5–12.

Specific examples of heteropoly-acids include phosphomolybdic acid, phosphotungstic acid, phosphomolybdotungstic acid, phosphomolybdovanadic acid, phosphomolybdotungstovanadic acid, phosphotungstovanadic acid, phosphomolybdoniobic acid, silicotungstic acid, silicomolybdic acid, silicomolybdotungstic acid, silicomolybdotungstovanadic acid, germanotungstic acid, arsenomolybadic acid and arsenotungstic acid.

Though the amount of the heteropoly-acid used is not particularly limited, when the amount of the heteropoly-acid in the reaction system is small the polymerization velocity tends to be low. The amount of the heteropoly-acid relative to the monomer is preferably 0.1–20 times by weight, more preferably 0.5–5 times by weight.

When the polymerization temperature is high, the degree of polymerization tends to be low owing to depolymerization of the polymer taking place. Therefore, the polymerization temperature is 0–150° C., preferably 30–80° C.

Since the polymerization reaction can be conducted while the monomer and the heteropoly-acid are being mixed, the reaction does not particularly require the use of a solvent, but, if desired, an inert solvent to the reaction may be added.

The present invention is described in detail below with reference to Examples, but the invention is in no way limited thereto.

EXAMPLE 1

The following polymerization was carried out by using the continuous polymerization apparatus shown in FIG. 1.

First, in the 500-ml reactor 1 having a stirring device and a reflux cooler was placed as a catalyst 110 ml of a solution of a specific gravity 2.1 obtained by dissolving silico-tungstic acid together with a small amount of water in THF, then 310 ml of THF (monomer) was added thereto, and the resulting mixture was stirred. The temperature of the reactor was set at 60° C., and the monomer was fed at a rate of 70 ml/h to the reactor 1. The reaction liquid was circulated between the reactor and the phase separation vessel 2, and the upper layer resulting from phase separation was withdrawn at the same rate as the monomer feed rate. During the reaction, the amount of water fed from the water feed vessel 3 to the reactor 1 was controlled so that the amount of water including coordinated water in the catalyst phase in the reactor 1 might be kept constant. The liquid withdrawn from the phase separation vessel 2 was fed to the distillation column 4 and the unreacted monomer was removed, to obtain polyether glycol (PTMG).

After about 10 hours of continuous operation, the number average molecular weight (Mn) and the molecular weight distribution (Mw/Mn) of PTMG at the stationary state were found to be 2,000 and 1.8, respectively.

To obtain a PTMG having a narrow molecular weight distribution, 45 ml of the silicotungstic acid catalyst solution was additionally supplied and the feed rate of THF was changed to 100 ml/hr without changing the liquid volume of the reactor 1. The value of V/F in the reaction decreased from 6.0 to 4.2. During the time, the stirring power per unit reaction liquid volume (P/V) was fixed at 2.0 kW/m$^3$.

The PTMG obtained had an Mn of 2,000 and an Mw/Mn of 1.6. Thus, the molecular weight distribution could be narrowed without change in the number average molecular weight by decreasing V/F.

The number average molecular weight and the molecular weight distribution (weight average molecular weight/ number average molecular weight) were determined by using gel permeation chromatography (GPC).

EXAMPLE 2

The same procedures as in Example 1 were followed except that the catalyst used was 50 ml of a phosphomolybdic acid solution adjusted to a specific gravity of 1.80, the initial charge of THF was 370 ml, V/F was 4 hours, stirring power (P/V) was 2.2 kW/m$^3$.

The PTMG obtained had an Mn of 1500 and an Mw/Mn of 1.6.

To obtain a PTMG having a wide molecular weight distribution, the catalyst volume was changed to 30 ml and V/F to 6.46 hours. As the result, a PTMG having an Mn of 1505 and an Mw/Mn of 1.8 was obtained.

EXAMPLE 3

The same procedures as in Example 2 were followed except that 140 ml of phosphomolybdic acid was used as the catalyst, V/F was changed to 4 hours and P/V was changed to 2.1 kW/m$^3$, to obtain a PTMG having an Mn of 1500 and an Mw /Mn of 1.65.

Further, to obtain a PTMG having a wider molecular weight distribution, the stirring power (P/V) was reduced to 1.2 while other conditions were kept unchanged, to obtain a PTMG having an Mw/Mn of 1.90. The PTMG had an approximately the same Mn of 1505.

EXAMPLE 4

Polymerization of THF was carried out according to the same procedure as in Example 1 except that phosphotungstic acid was used as a catalyst solution of a specific gravity of 2.05 and the reaction liquid volume V in the reactor 1 was kept constant at 420 ml. First, in order to find the relation between Mw/Mn and V/F, with P/V fixed at 1.9 kW/m³, the Mn and the Mw/Mn of PTMG obtained under conditions 1 to 3 shown in Table 1 were measured. The results obtained are shown in Table 1.

Next, in order to find the relation between Mw/Mn and P/V, with V/F fixed at 4 hours, the Mn and the Mn/Mw of PTMG obtained under conditions 4 to 6 shown in Table 2 were measured. The results obtained are shown in Table 2.

From the results shown in Table 1 and Table 2, the following relations (1) and (2) were obtained.

$$Mw/Mn = 1.46 \times (V/F)^{0.134} \quad (1)$$

$$Mw/Mn = 1.95 \times (P/V)^{-0.141} \quad (2)$$

In the operation of the condition (1), Mn was 1750 and Mw/Mn was 1.7. When the molecular weight distribution (Mw/Mn) is to be reduced to about 1.6, the appropriate value of V/F is expected, from the formula (1), to be about 2.0 hours. Accordingly, the amount of the catalyst was set at 180 ml, the THF feed rate was set at 210 ml/hr, and the withdrawing rate of the upper phase of the phase separation vessel 2 was also set at 210 ml/hr. The PTMG obtained had an Mw/Mn of 1.6 and an Mn of 1750.

stirring power of the reactor 1 was increased to 1765 mW, and polymerization reaction was continued.

The PTMG obtained had an Mw/Mn of 1.58 and an Mn of 1750. Thus, a PTMG having an approximately desired molecular weight distribution was obtained.

Industrial Applicability

According to the method of the present invention, polyether glycols which have a specified molecular weight and specified molecular weight distribution can be produced to meet intended uses.

What is claimed is:

1. A method for controlling the molecular weight distribution of polyether glycol obtained in producing polyether glycol having a specified number average molecular weight by polymerizing tetrahydrofuran as a starting monomer with the use of a heteropoly-acid as a catalyst, without substantially changing the average molecular weight which method comprises conducting the polymerization in the presence of an amount of water which can form two phases of an organic phase and a catalyst phase, sampling the polymerization product during the polymerization to determine the molecular weight distribution and, when the molecular weight distribution thus found is narrower than the specified molecular weight distribution, making the residence time distribution of the starting monomer in the catalyst phase

TABLE 1

| Condition | Heteropoly-acid | Reaction vessel total liquid amount V (ml) | THF feed rate F (ml/hr) | V/F (hr) | Catalyst *) amount (ml) | Number average molecular weight Mn | Molecular weight distribution Mw/Mn |
| --- | --- | --- | --- | --- | --- | --- | --- |
| 1 | Phosphotungstic acid | 420 | 140 | 3.0 | 120 | 1750 | 1.7 |
| 2 | Phosphotungstic acid | 420 | 85 | 4.95 | 75 | 1745 | 1.8 |
| 3 | Phosphotungstic acid | 420 | 60 | 7.0 | 50 | 1755 | 1.9 |

Note:
*) The amount of catalyst solution obtained by dissolving heteropoly-acid in THF in the presence of a very small amount of water and adjusting the liquid specific gravity by the amount of water added.

TABLE 2

| Condition | Heteropoly-acid | Reaction vessel total liquid amount V (ml) | Reaction vessel stirring power (mW) | P/V (kW/m³) | Number average molecular weight Mn | Molecular weight distribution Mw/Mn |
| --- | --- | --- | --- | --- | --- | --- |
| 4 | Phosphotungstic acid | 420 | 462 | 1.1 | 1750 | 1.90 |
| 5 | Phosphotungstic acid | 420 | 756 | 1.8 | 1745 | 1.82 |
| 6 | Phosphotungstic acid | 420 | 1092 | 2.6 | 1755 | 1.7 |

EXAMPLE 5

The conditions 6 of Example 4 were changed in order to narrow the molecular weight distribution. To obtain a PTMG having an Mw/Mn of 1.6, P/V was set at 4.2 on the basis of the calibration curve of the formula (2) of Example 4. The greater, while, when the found molecular weight distribution is wider than the specified molecular weight distribution, making the residence time distribution of the starting monomer in the catalyst phase less, wherein the residence time distribution in the catalyst phase of the starting monomer is controlled by varying the tetrahydrofuran residence time in the reaction vessel V/F, wherein V is the total liquid volume in the reaction vessel and F is the rate of monomer feed to the reaction vessel, V/F being increased when the molecular weight distribution of the polymer is to be widened, while V/F being decreased when the molecular weight distribution is to be narrowed.

2. A method for controlling the molecular weight distribution of polyether glycol obtained in producing polyether glycol having a specified number average molecular weight by polymerizing tetrahydrofuran as a starting monomer with the use of a heteropoly-acid as a catalyst, without substantially changing the average molecular weight which method comprises conducting the polymerization in the presence of an amount of water which can form two phases of an organic phase and a catalyst phase, sampling the polymerization product during the polymerization to determine the molecular weight distribution and, when the molecular weight distribution thus found is narrower than the specified molecular weight distribution, making the residence time distribution of the starting monomer in the catalyst phase greater, while, when the found molecular weight distribution is wider than the specified molecular weight distribution, making the residence time distribution of the starting monomer in the catalyst phase less, wherein the residence time distribution in the catalyst phase of the starting monomer is controlled by using a reaction vessel with a stirrer and varying the stirring power per unit reaction liquid volume P/V, wherein P is the stirring power and V is the total liquid volume in the reaction vessel, P/V, being decreased when the molecular weight distribution of the polymer is to be widened, while P/V being increased when the molecular weight distribution of the polymer is to be narrowed.

3. A method for controlling the molecular weight distribution of polyether glycol in producing polyether glycol having a specified number average molecular weight by polymerizing tetrahydrofuran with the use of a heteropoly-acid as a catalyst, which method comprises (a) the step of obtaining, under reaction conditions for obtaining a polymer product having a specified number average molecular weight, a calibration curve which shows the relationship between the residence time, V/F, wherein V is the total liquid volume in the reaction vessel and F is the rate of monomer feed to the reaction vessel, and/or the stirring power per unit reaction liquid volume in using a reaction vessel with a stirrer, P/V, wherein P is the stirring power and V is the total liquid volume in the reaction vessel, and the molecular weight distribution, (b) the step of conducting the polymerization in the presence of an amount of water which can form two phases of an organic phase and a catalyst phase, sampling the reaction liquid from the polymerization reactor during the polymerization to determine the number average molecular weight of the polymerization product and, when the number average molecular weight determined deviates from the specified value, modifying the reaction conditions to adjust the number average molecular weight to the specified value, (c) the step of determining the molecular weight distribution of the polymerization product which has reached the specified number average molecular weight, and (d) the step of collating, when the molecular weight distribution determined in the above step (c) differs from the specified value, the determined molecular weight distribution with the calibration curve obtained in the step (a) and adjusting the residence time and/or the stirring power to the value(s) corresponding to the specified molecular weight distribution.

4. The method according to claim 3, which comprises sampling the polymerization,product appropriately during the polymerization and repeating the steps (b) to (d).

5. A process for producing polyether glycol having a specified number average molecular weight and a specified molecular weight distribution by polymerizing tetrahydrofuran with the use of a heteropoly-acid as a catalyst, which process comprises (a) the step of obtaining, under reaction conditions for obtaining a polymer product having a specified number average molecular weight, a calibration curve which shows the relationship between the residence time, V/F, wherein V is the total liquid volume in the reaction vessel and F is the rate of monomer feed to the reaction vessel, and/or the stirring power per unit reaction liquid volume in using a reaction vessel fitted with a stirrer, P/V, wherein P is the stirring power and V is the total liquid volume in the reaction vessel, and the molecular weight distribution, (b) the step of conducting the polymerization in the presence of an amount of water which can form two phases of an organic phase and a catalyst phase, sampling the reaction liquid from the polymerization reactor during the polymerization to determine the number average molecular weight of the polymerization product and, when the number average molecular weight determined deviates from the specified value, modifying the reaction conditions to adjust the number average molecular weight to the specified value, (c) the step of determining the molecular weight distribution of the polymerization product which has reacted the specified number average molecular weight, and (d) the step of collating, when the molecular weight distribution determined in the above step (c) differs from the specified value, the determined molecular weight distribution with the calibration curve obtained in the step (a) and adjusting the residence time and/or the stirring power to the value(s) corresponding to the specified molecular weight distribution.

* * * * *

UNITED STATES PATENT AND TRADEMARK OFFICE
CERTIFICATE OF CORRECTION

PATENT NO.    : 6,395,938 B1
DATED         : May 28, 2002
INVENTOR(S)   : Takaharu Akedo It is certified that error appears in the above-identified patent and that said Letters Patent is hereby corrected as shown below:

<u>Title page,</u>
Item [30], Foreign Application Priority Data, "10-14476" should read
-- 10-144276 --; and "10-14477" should read -- 10-144277 --.

<u>Column 10,</u>
Line 18, after "catalyst", delete the comma.
Line 19, after "molecular weight", insert a comma.

<u>Column 11,</u>
Line 11, after "catalyst", delete the comma.
Line 12, after "molecular weight", insert a comma.
Line 29, after "P/V", delete the comma.

<u>Column 12,</u>
Line 16, "polymerization,product" should read -- polymerization product --.

Signed and Sealed this

Twenty-first Day of January, 2003

JAMES E. ROGAN
*Director of the United States Patent and Trademark Office*